United States Patent [19]

Stager

[11] Patent Number: 4,497,407
[45] Date of Patent: Feb. 5, 1985

[54] WELDING ROD PACKAGE

[76] Inventor: Daniel J. Stager, 110 Long St., Pleasant Hill, Ohio 45359

[21] Appl. No.: 600,417

[22] Filed: Apr. 16, 1984

[51] Int. Cl.³ .................... B65D 85/26; B65D 59/02
[52] U.S. Cl. ................................. 206/443; 206/526; 229/4.5; 53/444
[58] Field of Search ................... 206/443, 526, 45.34; 229/4.5; 312/73; 53/444

[56] References Cited

U.S. PATENT DOCUMENTS

| | | | |
|---|---|---|---|
| 1,682,179 | 8/1928 | Krembs | 206/443 |
| 2,464,278 | 3/1949 | Wilson | 229/5.7 |
| 2,491,213 | 12/1949 | Robinson, Jr. | 229/47 |
| 2,975,888 | 3/1961 | Paynton, Sr. | 206/45.34 |
| 3,084,788 | 4/1963 | Ford | 206/45.34 |
| 3,235,148 | 2/1966 | Honhart . | |
| 3,847,274 | 11/1974 | Inglish et al. | 206/443 |
| 4,029,202 | 6/1977 | Lasich et al. | 206/526 |
| 4,051,992 | 10/1977 | Bergstein | 229/4.5 |
| 4,163,517 | 8/1979 | Kappler et al. | 229/4.5 |

FOREIGN PATENT DOCUMENTS 1118095  11/1961  Fed. Rep. of Germany ...... 206/443

Primary Examiner—William T. Dixson, Jr.
Attorney, Agent, or Firm—Jacox & Meckstroth

[57] ABSTRACT

A bundle of welding electrodes or rods are confined within a substantially rigid cylindrical tube of extruded plastics material, and each end portion of the tube receives a cylindrical cup-shaped body of an end closure member molded of a more resilient plastics material. The body of each closure member is slightly larger than the inner diameter of the tube and is press-fitted into the tube to form an air-resistant seal with the tube. Either closure member may be removed by pulling the body from the tube or by impacting the body with the welding rods within the tube, and each closure member is reusable and resealable with the tube.

19 Claims, 4 Drawing Figures

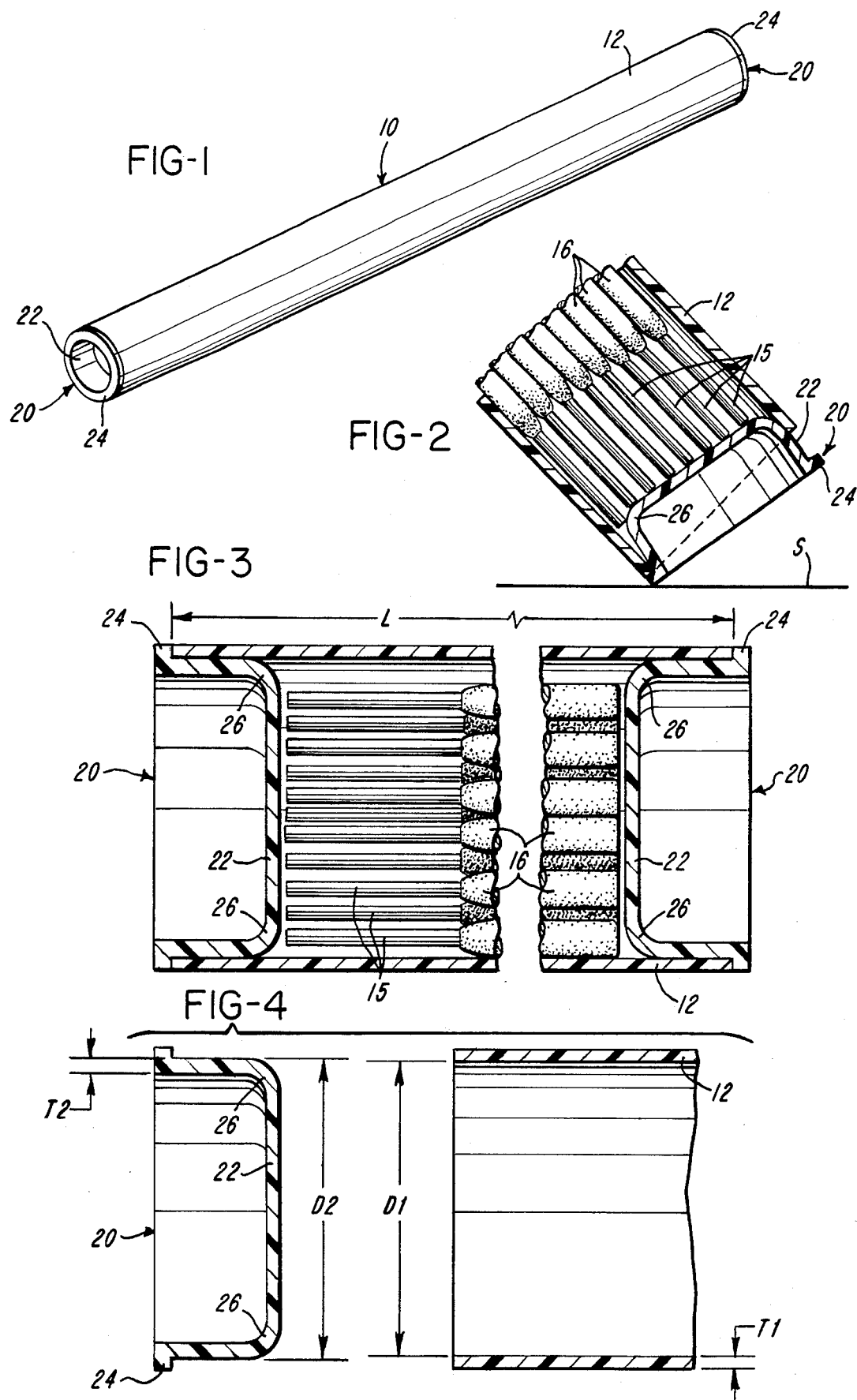

WELDING ROD PACKAGE

BACKGROUND OF THE INVENTION

In the distribution of electrical welding rods or welding electrodes, it is common to package the rods in cardboard cartons, usually with several pounds of rods in each carton. Since the cartons are not air-tight or moisture proof, it is desirable to use the welding rods in a relatively short time, especially if an open box of electrodes is exposed to an environment having a high humidity or moisture content.

It is highly desirable for the hydrophilic flux coating on welding electrodes or rods to have a low hydrogen content, especially when the rods are used to produce a weld having x-ray quality or where the base metal has a tendency to crack or has an alloy content greater than mild steel. A low hydrogen content is also desirable when the materials to be welded are relatively thick. Hydrogen is soluble in molten metal and is really absorbed in the weld during the welding operation. If moisture enters the welding operation, the moisture is disassociated to produce free hydrogen.

Hydrogen in the weld metal may cause porosity or embrittlement or cracking, and a small amount of moisture may cause an erratic arc, increased splatter and internal porosity which is difficult to detect. When hydrogen is held in the crystalline structure of steel, the steel may have embrittlement which may be observed as low ductility during a tensile test or low impact values or early failure in a bend test. The greatest problem with cracking caused by hydrogen arises in the heat-affected zones of hardenable steels. The hydrogen diffuses into the heated zone adjacent the weld metal and causes stress cracks. Thus it has been found desirable to maintain the moisture content of low hydrogen electrode coatings below 0.3%.

SUMMARY OF THE INVENTION

The present invention is directed to an improved welding rod package which is useable not only for shipping a batch or bundle of welding rods so that they are protected from impacts but is also useable for storing the rods in a sealed protected environment after one or more rods are removed from the package for use. The welding rod package of the invention is air and moisture resistant and is also highly durable to provide substantial resistance to impacts and crushing forces. Thus the reusable and resealable welding rod package of the invention provides the welding rods with a significantly extended shelf life and effectively prevents or minimizes the absorption of moisture by the welding rods so that the rods do not stick together and a minimum of free hydrogen is produced during use of the rods.

In accordance with one embodiment of the invention, a batch or bundle of welding electrodes or rods is confined within an elongated tube of extruded air-impervious plastics material which provides the tube with substantial rigidity for protecting the rods. A pair or set of end closure members are molded of an air-impervious plastics material and include cup-shaped cylindrical portions which are pressfitted into opposite end portions of the tube. The more resilient end closure members form air-resistant seals with the tube, but are removable and resealable with the end portions of the tube so that one or more welding rods may be removed for use and the remaining rods are sealed again for storage.

Other features and advantages of the invention will be apparent from the following description, the accompanying drawing and the appended claims.

BRIEF DESCRIPTION OF THE DRAWING

FIG. 1 is a perspective view of a welding rod package constructed in accordance with the invention;

FIG. 2 is an enlarged fragmentary section of one end portion of the tube shown in FIG. 1 and illustrating how the package may be opened;

FIG. 3 is an enlarged axial section of the tube shown in FIG. 1 with a center portion broken away; and FIG. 4 is an exploded axial section of one end portion of the package with the rods removed.

DESCRIPTION OF THE PREFERRED EMBODIMENT

FIG. 1 illustrates a welding rod package 10 including an elongated cylindrical tube 12 of extruded plastics material and having smooth inner and outer cylindrical surfaces. Preferably, the tube 12 is extruded from a high impact polystyrene modified with an impact improver sold under the trademark KRATON. The tube 12 has substantial rigidity and strength so that it cannot be collapsed by manual squeezing and will support a radial compression load of at least two hundred pounds without collapsing. Preferably, the tube has a Shore D durometer hardness between 70 and 78.

Enclosed within the extruded tube 12 is a batch or bundle of welding electrodes or rods 15 each having a flux coating 16 along a substantial portion of its length. The welding rods 15 have an overall length of about fourteen inches, and one form of the package 10 encloses three pounds of the welding rods 15. In this form, the tube 12 has a length L of about thirty-nine centimeters or about fifteen and one quarter inches and an inner diameter D1 between three and six centimeters and preferably about four centimeters. The wall thickness T1 of the tube 12 is between one and three millimeters and preferably about one and one half millimeters.

As shown in FIGS. 2 and 3, the opposite end portions of the tube 12 receive corresponding closure members 20 which are molded of a plastics material having a greater resiliency than the extruded tube 12, preferably having a Shore A durometer hardness between 85 and 95. One material which has proved effective for the closure members 20 is polyethylene vinyl acetate. Each of the closure members 20 includes a cup-shaped body 22 and an outwardly projecting peripheral flange 24. The body 22 has an outer diameter D2 which is slightly greater than the inner diameter D1 of the tube 12 when the closure member 20 is removed from the tube. In the preferred embodiment, the diameter D2 is about 1.67 inches in comparison with the diameter D1 of 1.62 inches so that the interference fit is about 0.05 inch. The thickness T2 of the body 22 is somewhat greater than the thickness T1 of the tube 12. In the preferred form, T2 is about 0.077 inch as compared with T1 of 0.066 inch.

After a bundle of welding rods 15 are inserted into the tube 12, the closure members 20 are pressed into opposite end portions of the tube 12 until the flanges 24 engage the corresponding end surfaces of the tube 12. The interference press-fit produces a high friction seal between each closure member 20 and the inner surface of the tube 12. This seal prevents air and moisture from seeping into the tube 12 so that the welding rods 15 are confined within a protected environment. The friction seals permit the package 10 to be submerged in water without water seeping into the tube 12. The smooth outer cylindrical surface of each closure member 20 cooperates with the smooth inner cylindrical surface of the tube 12, the greater resiliency of the closure member and the interference press-fit to form the fluid-resistant seal. The radius corners 26 on each closure member provide for quickly inserting each closure member into the corresponding end portion of the tube when a force of about 20 pounds is exerted axially on the closure member.

As shown in FIG. 2, when it is desired to open the welding rod package 10 to remove one or more of the welding rods 15, one end of the package 10 is impacted against a surface S one or more times, and the momentum of the welding rods 15 exerts an outward axial force on the closure member 20 so that the closure member is released from the end portion of the tube in response to the axial force exerted by the welding rods 15. While it is possible to pull a closure member 20 manually from the end portion of the tube 12, the substantial pressfit and the high friction seal requires that the closure member be pulled in successive increments around the peripheral of the flange 24. Accordingly, it is more convenient to open the package 10 by impacting the welding rods 15 against the inner surface of the closure member, as illustrated in FIG. 2.

From the drawing in the above description, it is apparent that a welding rod package constructed in accordance with the present invention, provides desirable features and advantages. For example, the package 10 provides an economical, reusable and resealable enclosure for a bundle of welding electrodes or rods and also provides substantial strength and durability to protect the welding rods against impacts and crushing and bending forces. In addition, the package forms an air and moisture-resistant enclosure which prevents moisture from being absorbed within the flux 16 on the welding rods 15 and also prevents the rods from corroding. By preventing moisture from entering the flux, hydrogen is prevented from entering the weld. After one or more welding rods are removed for use, the package may be quickly resealed simply by pressing the removed closure member 20 back into the corresponding end portion of the tube 12.

While the form of welding rod package herein described constitutes a preferred embodiment of the invention, it is to be understood that the invention is not limited to this precise form of package, and that changes may be made therein without departing from the scope and spirit of the invention as defined in the appended claims.

The invention having thus been described, the following is claimed:

1. A welding rod package for use in shipping and storing welding rods in a protected environment, comprising a bundle of welding rods having a predetermined length, an elongated tube of extruded air-impervious plastics material, said tube having opposite end portions and surrounding said bundle of rods, said tube extending the length of said rods and having substantial rigidity for protecting said rods against an impact, a set of end closure members of molded air-impervious plastics material and engaging said opposite end portions of said tube in press-fit relation, each of said end closure members conforming to the corresponding said end portion of said tube and forming an air-resistant friction seal with said end portion, and at least one of said closure members being removable from the corresponding said end portion of said tube and resealable therewith to form an economical and reusable air-resistant enclosure for the welding rods.

2. A welding rod package as defined in claim 1 wherein said tube is cylindrical, at least said one end closure member comprises a cup-shaped cylindrical body projecting into the corresponding said end portion of said tube, said body having an outer diameter slightly greater than the inner diameter of said tube when said closure member is removed from said tube, and said body has an outwardly projecting flange portion for engaging the corresponding end of said tube.

3. A welding rod package as defined in claim 2 wherein the inner diameter of said tube is less than six centimeters and greater than three centimeters, and said one end closure member has a resiliency greater than the resiliency of said tube.

4. A welding rod package as defined in claim 3 wherein the inner diameter of said tube is about four centimeters.

5. A welding rod package as defined in claim 1 wherein said tube has a wall thickness greater than one millimeter and less than three millimeters.

6. A welding rod package as defined in claim 5 wherein said tube has a wall thickness of about 1.5 millimeters.

7. A welding rod package as defined in claim 1 wherein said tube comprises a high impact polystyrene material, and at least said one end closure member comprises a polyethylene material.

8. A welding rod package as defined in claim 1 wherein said one end closure member has a wall thickness greater than the wall thickness of said tube.

9. A welding rod package as defined in claim 1 wherein said tube is cylindrical, each of said end closure members includes a cupshaped cylindrical body projecting into the corresponding said end portion of said tube in press-fit sealing relation, and at least said one end closure member is removable from said tube in response to a force exerted by said welding rods when an end of said package is impacted against a surface.

10. A welding rod package for use in shipping and storing welding rods in a protected environment, comprising a bundle of welding rods having a predetermined length, an elongated cylindrical tube of extruded plastics material and surrounding said bundle of rods, said tube extending the length of said rods and having substantial rigidity for protecting said rods against an impact, said tube being air impervious and having opposite end portions, a set of end closure members of molded air-impervious plastics material and including cup-shaped cylindrical bodies extending into said opposite end portions of said tube in press-fit relation, said body of each of said end closure members conforming to the corresponding said end portion of said tube and forming a fluid-resistant friction seal with said end portion, at least one of said closure members being removable from the corresponding said end portion of said tube in response to an impact of said rods within said tube, and said one end closure member being resealable with the corresponding said end portion of said tube to form an economical and reusable fluid-resistant enclosure for the welding rods.

11. A welding rod package as defined in claim 10 wherein said body of said one closure member has an outer diameter slightly greater than the inner diameter of said tube when said closure member is removed from said tube, and said body has an outwardly projecting flange portion for engaging the corresponding end of said tube.

12. A welding rod package as defined in claim 10 wherein the inner diameter of said tube is less than six centimeters and greater than three centimeters, and said one end closure member has greater resiliency than said tube.

13. A welding rod package as defined in claim 12 wherein said tube has a wall thickness greater than one millimeter and less than three millimeters.

14. A welding rod package as defined in claim 13 wherein said tube has a wall thickness of about 1.5 millimeters.

15. A welding rod package as defined in claim 10 wherein said one end closure member has a wall thickness greater than the wall thickness of said tube.

16. A method of packaging a plurality of welding rods for shipping and storing the rods in a protected environment, comprising the steps of extruding an elongated substantially rigid tube of air-impervious plastics material, cutting the tube to a length generally the same as the rods, inserting the rods into the tube, molding a set of end closure members of air-impervious plastics material, pressing the end closure members into friction engagement with opposite end portions of the tube, forming an air-resistant seal between each closure member and the corresponding end portion of the tube, and forming at least one of the end closure members to be removable from the corresponding end portion of the tube and resealable therewith in response to pressing the closure member onto and from the tube to provide an economical and reusable air-resistant enclosure for the welding rods.

17. A method as defined in claim 16 wherein the tube is extruded in cylindrical form, the one end closure member is molded with a cupshaped cylindrical body for projecting into the corresponding end portion of the tube, the body is formed with an outer diameter slightly greater than the inner diameter of the tube when the closure member is removed from the tube, and the body is formed with an outwardly projecting flange portion for engaging the corresponding end of the tube.

18. A method as defined in claim 17 wherein the one end closure member is molded with a greater resiliency than the resiliency of the tube.

19. A method as defined in claim 18 wherein the tube is formed with a Shore D durometer hardness between 70 and 78, and the one end closure member is formed with a Shore A durometer hardness between 85 and 95.

* * * * *